INVENTOR
HUA-TUNG LEE

BY Frank Chaslejian

ATTORNEY

April 14, 1964 HUA-TUNG LEE 3,129,324

ARITHMETIC SYSTEM

Filed Nov. 19, 1959 3 Sheets-Sheet 2

April 14, 1964 HUA-TUNG LEE 3,129,324

ARITHMETIC SYSTEM

Filed Nov. 19, 1959 3 Sheets-Sheet 3

United States Patent Office 3,129,324
Patented Apr. 14, 1964

3,129,324
ARITHMETIC SYSTEM

Hua-tung Lee, Peekskill, N.Y., assignor to International Business Machines Corporation, New York, N.Y., a corporation of New York Filed Nov. 19, 1959, Ser. No. 854,056
17 Claims. (Cl. 235—175)

This invention relates to digital computing systems and more particularly to a switching system capable of handling randomly timed input data and to manifest an arithmetic operation thereon.

The prior art is replete with arithmetic switching systems which are capable of performing full adder operations on binary information wherein the information or data input to such systems have a defined relationship. This defined relationship is manifested by providing the variable information, which is to be summed, to each full adder stage either coincidently or sequentially. Thus, a first chain of variable information representative of a given number coded in binary form and a second chain of variable information similarly coded is presented to an arithmetic system either in a sequential manner, termed serial type operation, or in a coincident manner, termed parallel type operation. It is apparent that the parallel type of operation is generally faster than the serial type; however, when employing parallel type operation much more hardware is necessitated wherein each stage usually requires a multiplicity of interconnecting logical circuits.

By construction of a multistage binary full adder system in accordance with this invention, the feature of machine timing flexibility gained by serial type data processing and speed of operation gained by parallel type data processing in the prior art arithmetic switching systems are both realized. Further, each full adder stage of the multistage system is made up of a single component materially reducing the number of individual components heretofore employed.

A binary full adder may be described as a device capable of producing the sum of two binary bits with provision for adding a carry from the next lower order and producing a carry signal to the next higher order. In binary code, a bit is represented as a 0 or 1 and as herein employed, the 1 is represented as a positive signal. Thus, in a binary full adder there are three inputs, two independent inputs representing bits of the two numbers to be added and one a dependent input representing a carry from the previous stage. In such an adder, the sum output should be 0 when none or two of the input signals are 1; but should be 1 when 1's are presented at one or all three of the input lines. Further, a carry output shoulder be 0 when none or one of the input signals are 1; but should be 1 when 1's are presented at any two.

Generally, a multistage binary adder is constructed according to this invention wherein each stage has a first and a second information input line and a carry input with a carry output and a sum output, with each stage having means coupling the input and outputs responsive to the random energization of said inputs to provide a signal on the carry output when any two inputs are energized and further responsive to the random energization of any one and all three of said inputs only to provide an output signal on the sum output.

More specifically, a single multipath core made of magnetic material exhibiting rectangular loop properties is employed as the coupling means to accomplish full binary addition. The magnetic core has a central aperture and three secondary apertures centrally located in the main flux path of the core dividing the main flux path into two parallel flux paths of unequal length. The cross-sectional areas of the material on either side of each secondary aperture are equal and a different input winding couples the different portions of the core adjacent the secondary apertures bounded by the outer periphery of the core. A reset winding embracing the total cross-sectional area of the core is adapted to be energized in a second portion of each add cycle and orient the direction of flux within the core in a counter-clockwise direction. Upon energization of any one of the different inputs to the core, the flux orientation within the area of the core embraced is reversed. A carry output winding and two further output windings for manifesting the sum of the bits added each thread through the different apertures of the core in a predetermined combinatorial manner such that an output signal is provided on the carry output winding whenever two or more of the input windings are energized in representing a binary 1. That is, the input windings may be energized randomly in coincidence, in partial coincidence or sequentially. Thus, upon receipt of two inputs, randomly provided, a carry output is immediately available to provide "ripple through" carry operation. Further, because of the type material employed, the core remembers how many input windings are energized and upon reset delivers a positive output signal on one of the two further output lines which are appropriately connected to a single sum output line providing a positive output signal to denote a binary 1 whenever one or all three inputs are energized during the first portion of the add cycle.

Thus the binary full adder of this invention is capable of manifesting the sum of two independent inputs and providing a carry wherein each stage comprises a magnetic core made of material capable of attaining different stable states of flux orientation having reset means coupled thereto. A first and a second input means are coupled to the core and adapted to be energized in representing independent variable inputs; a third input winding is coupled to the core also adapted to be energized in representing a dependent variable input; a carry output winding is coupled to the core; and a first and a second sum output winding are coupled to the core and commoned to single sum output line. Therefore, the core is responsive to the random energization of the input windings to provide a signal on the carry output winding when any two of said input windings are energized during a first portion of an adding cycle and the core is further responsive to the energization of the reset means during a second portion of said add cycle to provide an output signal on the sum output line whenever one or all three of the input windings are energized during the first portion of the add cycle.

Accordingly, a prime object of this invention is to provide an improved arithmetic switching system.

A further object of this invention is to provide a multistage binary adder which is capable of "ripple through" carry operation and of handling both serial and parallel information input randomly.

Still a further object of this invention is to provide a novel binary full adder.

Yet another object of this invention is to provide a novel binary full adder employing a single magnetic core component which is responsive to random information inputs.

The foregoing and other objects, features and advantages of the invention will be apparent from the following description of a preferred embodiment of the inevntion, as illustrated in the accompanying drawings.

Figure 1:
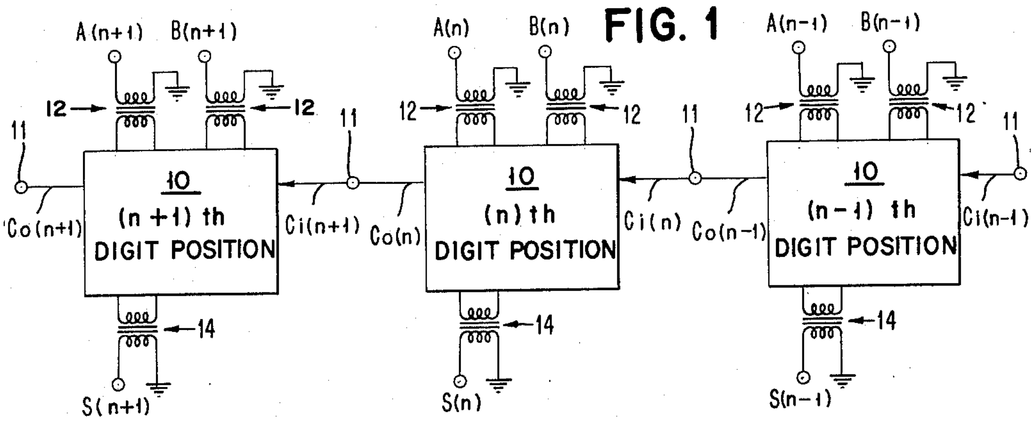
FIG. 1 is a representation of a multistage binary full adder system.

Referring to the FIG. 1, shown in box diagram form is a section of a multistage binary arithmetic circuit in accordance with this invention wherein a number of binary full adder stages 10 are shown each having a first, a second and a third variable input thereto labelled A, B and $C_i$, respectively. Each stage 10 is also provided with two outputs labeled $C_o$ and S. The inputs $C_i$ denotes a carry input from the preceding stage 10 while the output $C_o$ denotes the carry output from the particular stage to the next succeeding stage. As shown, the carry output $C_o$ of each stage is connected to the carry input $C_i$ of the next succeeding stage through a terminal 11. The inputs A and B for each stage 10 are connected by individual coupling transformers 12 while similarly the sum output line S of each stage 10 is connected by means of coupling transformers 14. It is the function of each box 10 to provide a full adder operation on binary information, that is, a circuit capable of producing a first and a second order output, usually termed sum and carry outputs, indicative of the binary addition of three binary input factors. Signals representative of values for two independent factors are applied to each of the binary adder input lines A and B while a signal representative of a carry from the preceding stage of the multistage adder is applied to the adder input line $C_i$. The prior art has shown such adders as capable of performing the arithmetic function desired in cases where the A and B inputs are first applied to the lowest order stage and then succeedingly to the higher order stages in order to allow time for manifestation of a carry output from the lowest to the highest order state, i.e. serial type adders, and have also shown where a "ripple carry" operation may be attained where the A and B inputs to each stage are coincidently applied to "set up" each stage and thence manifestation of the carry takes place by "rippling" through each state, i.e. parallel type adders, as is described in a copending application Serial Number 704,709, filed December 23, 1957, now Patent No. 2,962,215, which is assigned to the same assignee. It is manifest that in these prior art arithmetic systems, their speed is directly dependent upon carry propagation from one stage to another and that once a particular criteria has been established, the input variables must be applied either serially or in parallel. The arithmetic circuit of FIG. 1 is adaptive to receive the input variables A and B sequentially or coincidently in any order and also capable of manifesting the highly desired ripple through operation for carry propagation.

To simplify, consider the function of each stage 10. Since each stage 10 is a binary full adder, it must be capable of providing an output on the sum output line S when any one or any three of the inputs, A, B or $C_i$ representing a binary 1, is energized. Further, each stage 10 must be capable of providing a carry output indication on the carry output line $C_o$ when any two or three of the inputs A, B or $C_i$, are energized representing a binary 1. The inputs A and B, which are independent variables to be added for each stage 10, may be randomly provided to any of the stages coincidently or sequentially. All the A inputs for the stages 10 need not be provided simultaneously nor do all the B inputs. The A input for one stage may be provided at one time, the B input for another stage at another time while the B input for the one stage may appear thereafter or coincidently while the A input for the other stage may appear subsequent, preceding or coincidently with any or all of the other variables. Each stage 10 is responsive to any two inputs, A, B or $C_i$, when received either coincidently or sequentially, to immediately manifest a carry indication on its carry output line $C_o$ and provide a carry input to the succeeding stage 10 of the multistage system of FIG. 1. Thus, when any one stage 10, the *n*th stage, receives a binary 1 input from any one independent variable $A_n$ or $B_n$, while the succeeding stage $(n+1)$, receives a binary 1 input on both its $A(n+1)$ and $B(n+1)$ input lines a carry indication is immediately manifested on the $C_o(n+1)$ output line. The *n*th stage may then receive an input on its other input line $A_n$ or $B_n$ to manifest an output on its $C_{on}$ output line and thereby deliver an input to the succeeding $(n+1)$th stage on the $C_{in}$ input line. The sum output for each stage 10 of the system of FIG. 1 is manifested upon reset and therefore each stage 10 is capable of remembering how many binary 1 inputs were received and upon reset manifests a sum output on the S output line when only one or three of the input lines A, B and $C_i$ were energized.

Figure 3:
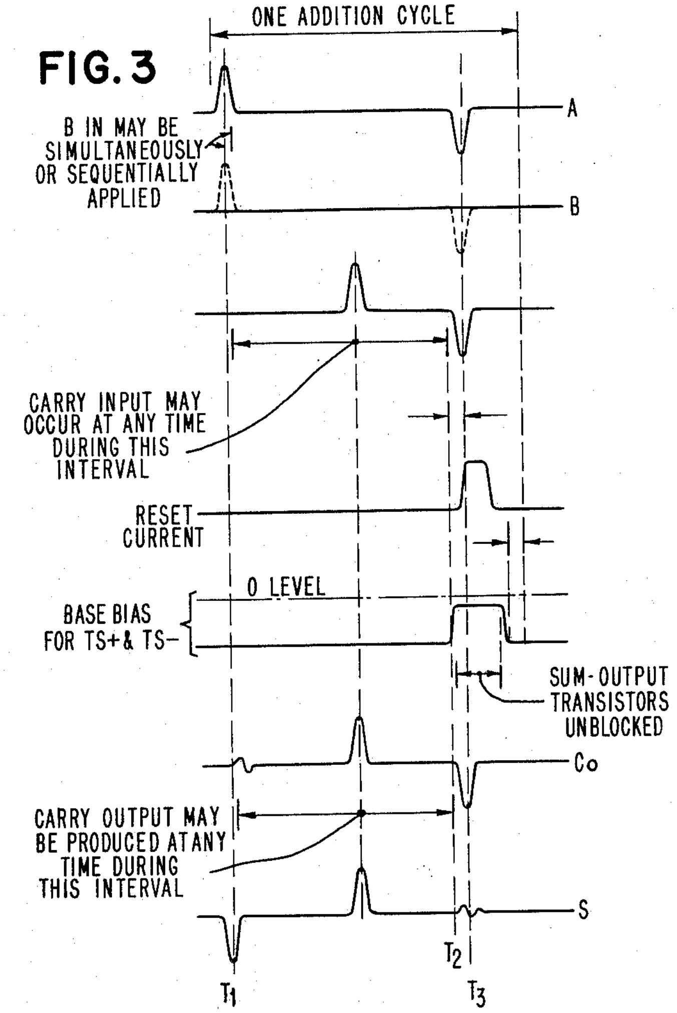
FIG. 3 is a representation of the various signals during one addition cycle of the adder of FIG. 1.
Figure 2:
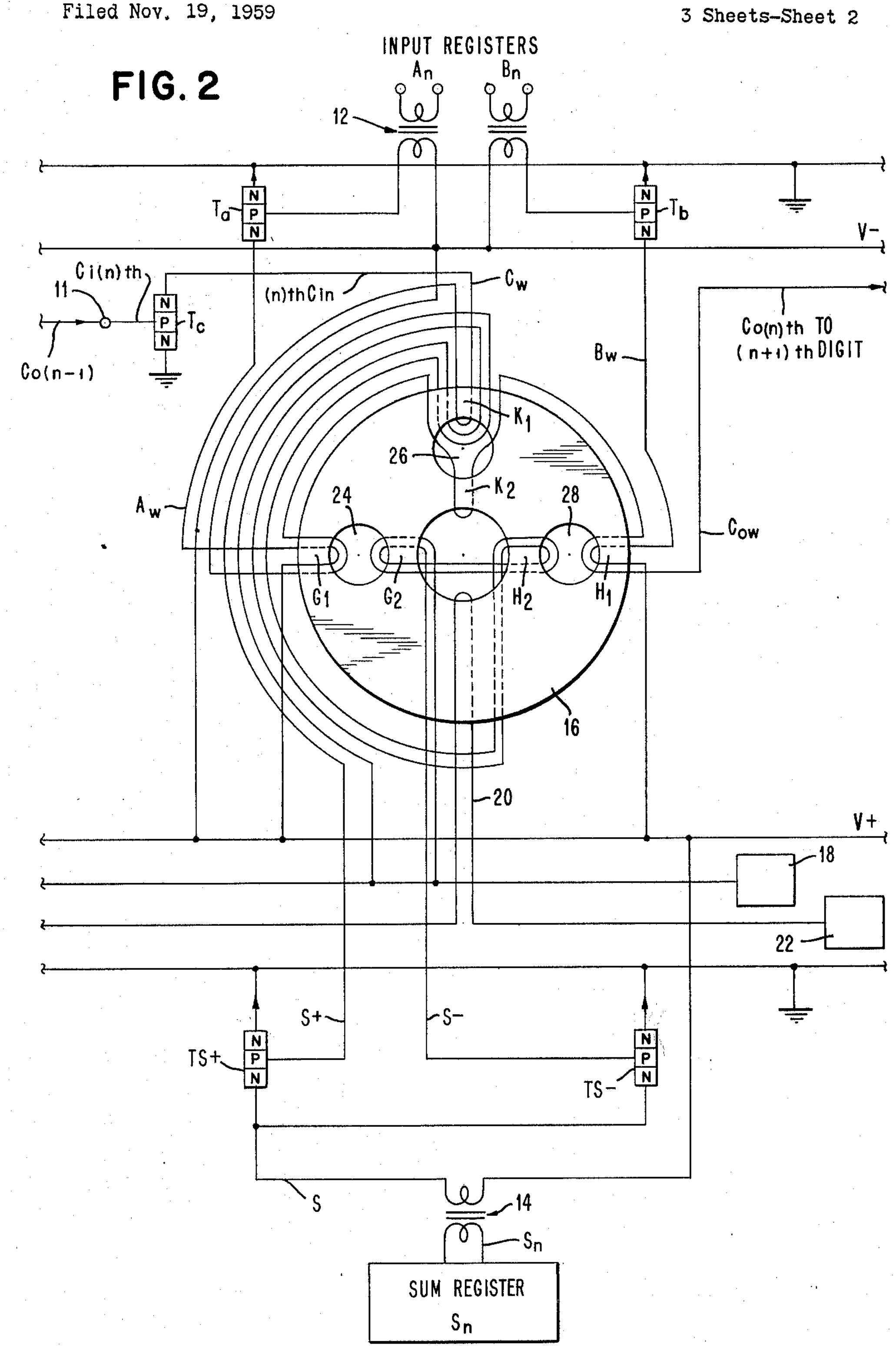
FIG. 2 represents an embodiment of one stage of the multistage adder of FIG. 1 in accordance with this invention.

Referring to the FIG. 2, a circuit embodiment of this invention is shown depicting one stage 10 of the multistage arithmetic circuit shown in FIG. 1 which is adapted to operate as related above in accordance with the timing chart shown in the FIG. 3. In the FIG. 2, the input lines $A_n$ and $B_n$ are shown coupled to switching transistors $T_a$ and $T_b$, respectively, through transformers 12. Each of the transistors T may be NPN transistors having a base, collector and an emitter electrode. The emitter of each transistor $T_a$ and $T_b$ is connected to ground with the base connected to a negative voltage source $V^-$ through one winding of the transformer 12. The collector of transistor $T_a$ is connected to a source of positive voltage $V^+$ through an input winding $A_w$ on a magnetic core 16, while the collector of transistor $T_b$ is connected to the source $V^+$ through an input winding $B_w$. The input line $C_i$ is connected to an NPN switching transistor $T_c$ having a base electrode connected to the line $C_{in}$, an emitter electrode connected to ground, and a collector electrode connected to the source $V^+$ through an input winding $C_w$ on the core 16. The core 16 is provided with output windings $C_{ow}$, $S^-$ and $S^+$, with one end of the winding $C_{ow}$ connected to $V^-$ and the other end being the output line $C_o$ for that stage. The output windings $S^-$ and $S^+$ have one end connected to a gated bias source 18 with their other end connected to the base electrodes of gating NPN transistors $TS^-$ and $TS^+$, respectively. The transistors TS have an emitter electrode connected to ground with a collector electrode of each commoned and thence connected to the source $V^+$ through the transformer 14 coupling the sum output line S for the stage 10. The sum output line S of each stage 10 is ordinarily connected to a sum register, as shown in block form. Further, the core 16 is also provided with a reset winding 20 connected to a reset pulse source 22.

With energization of the input lines $A_n$, $B_n$ or $C_n$, denoting a binary 1, the base of the respective transistors $T_a$, $T_b$ or $T_c$ is made positive with respect to ground unblocking the transistor to energize the windings $A_w$, $B_w$ or $C_w$. In accordance with the timing chart shown in FIG. 3, the inputs A, B or $C_i$ may appear during a time $t_1$—$t_2$ in the cycle. Upon receipt of any two binary 1 inputs, a carry output is immediately induced on the winding $C_{ow}$ and, as stated above, the sum output is derived upon reset of the core 16 of each stage 10. At the time $t_2$ in the FIG. 3, the source 18 delivers a clock pulse to the output windings $S^-$ and $S^+$ and at a time $t_3$ the source 22 energizes the reset winding 20 on the core 16. As will be described below in detail, for all none 0 cases but one, the $S^+$ output winding is provided with a positive induced voltage while the $S^-$ is provided with a negative induced voltage and thus in all but this one case the transistor $TS^+$ is active while for this one case the transistor $TS^-$ is active and because of the commoned collector electrodes of $TS^+$ and $TS^-$ provides a similar polarity output on the output line S of the stage shown in FIG. 2.

Figure 4:
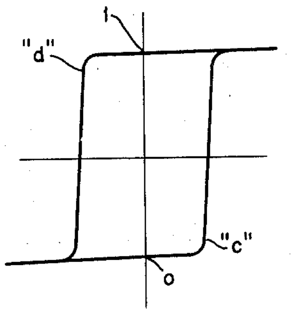
FIG. 4 represents a plot of the hysteresis loop of the type material herein employed.

Referring again to the FIG. 2, the core 16 is made of magnetic material commonly known in the art as "rectangular loop" material; that is a material for which a plot of flux density B vs. magnetic field intensity H, is in the form of an essentially rectangular hysteresis loop. A plot of this type is shown in FIG. 4 and, as there demonstrated, the material exhibits two limiting states of flux remanence designated "0" and "1" in representing binary information, and the "knees" of the loop, designated "*c*" and "*d*," are relatively sharp indicating that the material has a sharply defined threshold which must be exceeded to initiate flux reversal from one direction to another. The core 16 has a number of pierced openings 24, 26 and 28 at points along its mean circumference which are located in the center of the main circular flux path through the core 16 defining an inner and outer flux path. With the core 16 established in a datum stable state, by means of the reset winding 20 which embraces the total cross-section of the core, so that the flux is oriented in a counter-clockwise direction as indicated in the FIG. 5, signal inputs are applied to the structure by means of input windings $A_W$, $B_W$ and $C_W$, which thread the openings 24, 28 and 26, respectively, and embrace the outer flux path.

In order to subsequently describe the different flux patterns obtained when the input windings $A_W$, $B_W$ and $C_W$ are energized either individually, coincidently, or sequentially in a random order, the areas of the core 16 adjacent each of the apertures 24, 26 and 28 will be hereinafter referred to and labelled $G_1$, and $G_2$ for the areas on either side of the aperture 24, $H_1$ and $H_2$ for the areas on either side of the aperture 26, and $K_1$ and $K_2$ for the areas on either side of the aperture 28. The carry output winding $C_{ow}$ couples the legs $G_1$ and $H_1$ in series aiding relationship and further couples the leg $K_2$ in series opposition; the $S^+$ output winding couples the legs $G_2$ and $H_2$ in series aiding relationship and the leg $K_1$ in series opposition; while the $S^-$ output winding couples the legs $G_2$ and $H_2$ in series aiding relationship and the leg $K_1$ in series opposition. Thus the carry output winding $C_{ow}$ may be said to link the core 16 by the notation $+G_1+H_1-K_2$, the $S^-$ output winding may be described as linking the core 16 by the relationship $+G_2+H_2-K_1$; and the relationship $-G_2-H_2+K_1$ describes the linkage for the $S^+$ output winding.

The core 16 with its three input windings $A_W$, $B_W$ and $C_W$ which respectively link the legs $G_1$, $H_1$ and $K_1$ undergoes various flux changes when input pulses representative of binary 1 inputs of sufficient magnitude to cause flux reversal are applied individually, coincidently or sequentially to these input windings. Initially, with the core 16 reset to a condition of flux remanence, which describes a counter-clockwise flux orientation, as indicated by arrows as shown in the FIG. 5, if the winding $A_W$ is energized to cause a reversal of flux in the leg $G_1$, a flux pattern as is shown in the FIG. 6 is set up. The flux pattern shown in the FIG. 6 describes a clockwise orientation pattern about the aperture 24, while the flux pattern about the apertures 26 and 28 describes a counter-clockwise flux pattern. It should be noted that the inner flux path of the core 10 has reversed its direction of flux orientation and thus the orientation within the legs $H_2$ and $K_2$ has reversed its direction. If, however, the $B_W$ winding were energized instead of the $A_W$ winding, the flux orientation pattern provided in the core 16 changes from that shown in the FIG. 5 to that shown in the FIG. 7. Again note that the flux pattern about the aperture 28 is clockwise while the flux pattern about the remaining apertures is counter-clockwise with reversal taking place in the inner flux path of the core 16. The same type of configuration of flux may be seen to take place with energization of the $C_W$ input winding alone as is shown in the FIG. 8; note the direction of the arrows about the aperture 26 and the apertures 24 and 28.

Assume that two of the input windings, say the windings $A_W$ and $B_W$ are coincidently energized. Upon coincident energization of the windings $A_W$ and $B_W$ a clockwise flux pattern is set up about the aperture 24 and, similarly, a clockwise flux pattern is set up about the aperture 28 with a counter-clockwise flux pattern set up about the aperture 26 with reversal of the magnetization within the leg $K_2$ taking place as is shown in the FIG. 9.

Figure 10:
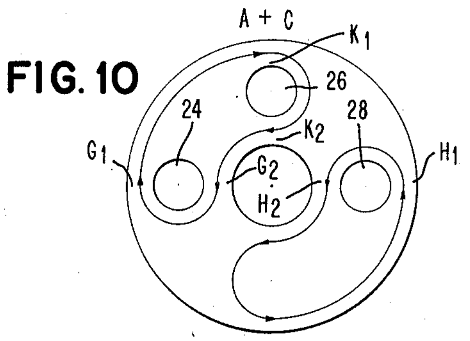

Referring to the FIG. 10, the flux pattern of the core 16 when both the input windings $A_W$ and $C_W$ are coincidently energized is shown. Again, a clockwise flux pattern is set up about the apertures 24 and 26 while a counter-clockwise flux pattern is set up about the aperture 28 with reversal of the magnetization taking place within the leg $H_2$, this being the inner flux path. Referring to the FIG. 11, the flux pattern for coincident energization of the $B_W$ and $C_W$ input windings is shown with the patterns describing a clockwise orientation about the apertures 26 and 28 and a counter-clockwise orientation about the aperture 24.

Figure 12:
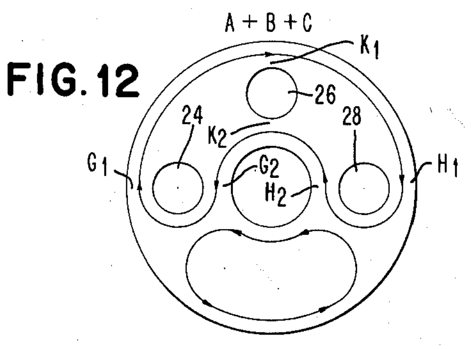

Referring now to the FIG. 12, the flux pattern within the core 16 is shown for the case when all three input windings $A_W$, $B_W$ and $C_W$ are coincidently energized. As may be seen with reference to the FIG. 12, a clockwise flux pattern is set about each of the apertures 24, 26 and 28 with flux reversal taking place in each of the legs $G_1$, $H_1$ and $K_1$.

The circuit of FIG. 2 is capable of providing a full adder operation on the three inputs provided to the core, with the inputs A and B denoting variable inputs and the input $C_i$ denoting a carry input from a preceding similar stage or circuit. It is the object of this structure of FIG. 2 to provide, as stated above, ripple through operation. The output from the carry output winding $C_{ow}$ is obtained when any two of the inputs are received while outputs from the sum output lines $S^+$ and $S^-$ are obtained at reset time. Further, the circuit of FIG. 2 is adapted to operate within a specified time cycle as is shown in the FIG. 3 which is a plot of the various input signals vs. time wherein the various pulses may occur and with which the circuit of FIGS. 1 and 2 is adapted to operate. For ease of understanding, a positive voltage is said to be induced on a winding coupling a particular leg of the core 16 when reversal takes place from a counter-clockwise to a clockwise direction while a negative voltage is induced with the reverse orientation.

Referring to the FIG. 3, in any one addition cycle, as indicated, energization of the $A_W$, $B_W$ and $C_W$ input windings may occur any time within a period $t_1$ through $t_2$, with a carry indication, or carry output, capable of being manifested at any time $t_1$ through $t_2$ when any two of the inputs A, B or $C_i$ are energized, as will become clear in the detailed description to follow.

Since the object of this invention is to provide a binary full adder capable of providing ripple through carry operation in the shortest possible time wherein the variables to be added are registered randomly within a time $t_1$—$t_2$, manifestation of a carry output on the winding $C_{ow}$ will first be considered. It will be assumed in each operation described, a full add cycle, as shown in the FIG. 3, the reset winding 20 has been energized by the source 22 causing a datum flux orientation of the core 16 of FIG. 2 to be assumed as is shown by the counter-clockwise pattern in the FIG. 5.

Figure 5:
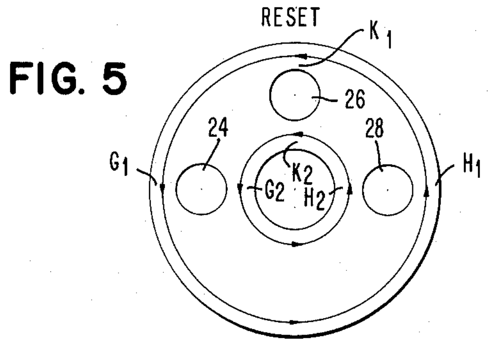
FIG. 5 represents the orientation of flux within the core employed in the embodiment of FIG. 2 when reset.
Figure 6:
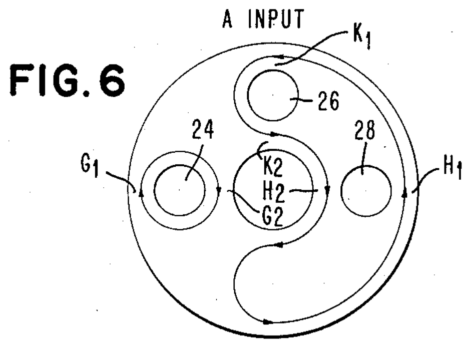
FIGS. 6–12 represent the different orientations of flux due to different input conditions.

Energization of the $A_W$ input winding any time within the interval $t_1$—$t_2$ causes a change in the flux pattern shown in the FIG. 5 to that shown in the FIG. 6 and the voltage induced on the carry output winding $C_{ow}$ is 0; i.e.

$$G_1+H_1-K_2=+1+0-(+1)=0$$

Figure 7:
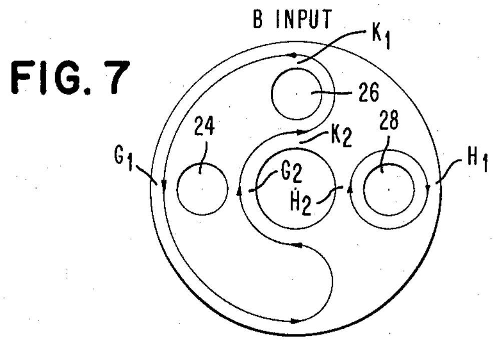

Similarly, energization of the $B_W$ input winding alone within the interval $t_1$—$t_2$ causes the flux pattern within the core 16 of the FIG. 2 to change from that shown in FIG. 5 to that shown in FIG. 7 and the voltage induced on the carry output winding $C_{ow}$ is again 0;

$$G_1+H_1-K_2=0+(+1)-(+1)=0$$

Figure 8:
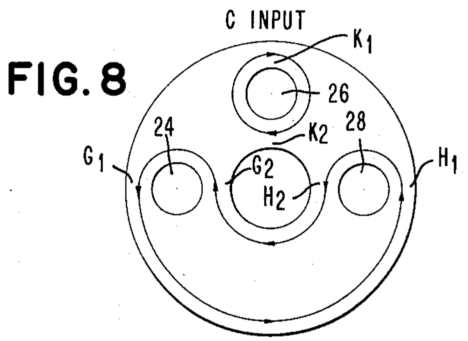

With only the $C_w$ input winding energized within the time $t_1$—$t_2$, the flux orientation changes from that shown in the FIG. 5 to that shown in the FIG. 8 providing no carry output on the winding $C_{ow}$;

$$G_1+H_1-K_2=0+0-0=0$$

If two of the input windings $A_w$, $B_w$ or $C_w$ are energized during the time $t_1$—$t_2$, the circuit of FIG. 2 is immediately responsive to provide a carry output on the output winding $C_{ow}$. Consider the case when first the $A_w$ and thereafter the $B_w$ input winding is energized. The flux pattern is changed from that shown in the FIG. 5 to that of FIG. 6, there being no voltage induced on the carry output winding $C_{ow}$ as described above, and then an orientation change from that shown in the FIG. 6 similar to that shown in the FIG. 9 takes place. As may be seen from the flux configuration of FIG. 9, a change in flux orientation has taken place only within the leg $H_1$ and thus $$G_1+H_1-K_2=0+1-0=+1$$

providing an induced voltage on the carry output winding $C_{ow}$ immediately upon receipt of the second input; which as here described is energization of the $B_w$ input winding.

Figure 9:
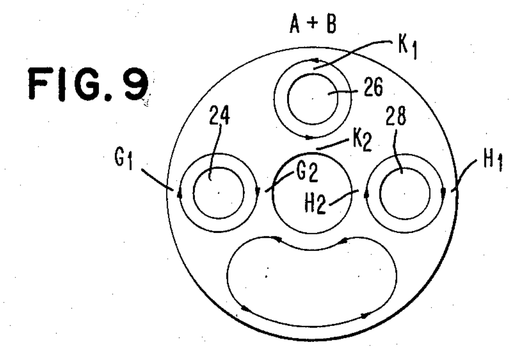

Taking the case where first the $B_w$ input winding is energized and then the $A_w$ input winding, the flux orientation changes from that of FIG. 5 to that shown in FIG. 7, providing no carry output as related above, and thence to an orientation similar to that shown in the FIG. 9. The change is now detected in the leg $G_1$, and hence $$G_1+H_1-K_2=1+0-0=1$$

again providing the desired carry output.

When both the $A_w$ and $B_w$ input windings are energized coincidently within the time $t_1$—$t_2$, the flux configuration of FIG. 5 changes to that shown in the FIG. 9 with the relationship $$G_1+H_1-K_2=1+1-(+1)=1$$

to again provide the desired carry output indication.

Considering energization of the $C_w$ input winding, a carry indication from the previous stage, in combination with the energization of either the $A_w$ or $B_w$ input winding in sequence or coincidence within the time $t_1$—$t_2$; in the case where the inputs arrive sequentially with the $C_w$ input winding energized first and then the $A_w$ input winding, the flux orientation changes from that of FIG. 5 to that of FIG. 8 and thence similar to that shown in FIG. 10 providing a carry output;

$$G_1+H_1-K_2=1+0-0=1$$

while if the $B_w$ input winding alone were energized after the $C_w$ input winding, the flux configuration changes from that shown in the FIG. 8 to a configuration similar to that of the FIG. 11, again providing a carry output;

$$G_1+H_1-K_2=0+1-0=1$$

Figure 11:
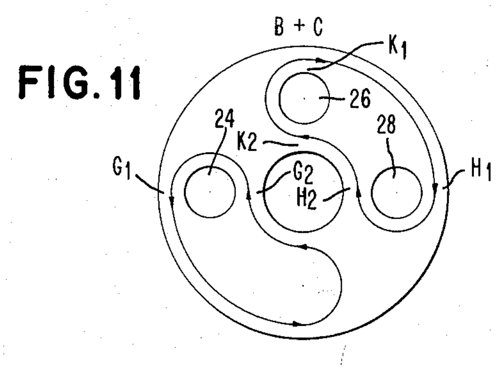

Taking the reverse case when the A or B input are first provided and then the C input, the flux configuration first changes from that shown in FIG. 5 to that shown in FIG. 6, for an A input, or to that shown in FIG. 7 for a B input, and thence to a similar orientation shown in FIG. 10 or shown in FIG. 11, respectively. In both the case of the A or B input in combination with the C input the relationship $$G_1+H_1-K_2=0+0-(-1)=1$$

takes place to again provide the induced carry output on the winding $C_{ow}$.

In the case when the $C_w$ input winding is coincidently energized with either the $A_w$ or $B_w$ input winding, the flux configuration changes from that of FIG. 5 to that shown in FIG. 10 or 11, respectively, with the respective relationships $$G_1+H_1-K_2=1+0-0=1 \text{ for } A_w$$

$$G_1+H_1-K_2=0+1-0=1 \text{ for } B_w$$

taking place to provide, in both cases, an induced voltage on the carry output winding $C_{ow}$.

There has been shown that for any two combinations of inputs to the circuit of FIG. 2, whether such inputs are energized coincidently or sequentially, a carry output is provided. In each case, the flux configuration immediately preceding the final configuration is considered to arrive at the proper value for the voltage induced on the output winding $C_{ow}$. It will now be shown that upon energization of all three inputs, A, B and C, either coincidently or sequentially, in any combination, a voltage is induced on the carry output winding $C_{ow}$.

It has been shown above that upon energization of any two input windings $A_w$, $B_w$, $C_w$ in any random fashion a carry indication is provided during the interval $t_1$—$t_2$, and therefore the addition of a third input displaced in time from any of the two combinations already considered is not necessary. The only condition remaining to be considered then is when all three input windings $A_w$, $B_w$ and $C_w$ are coincidently energized. Upon the coincident energization of the windings $A_w$, $B_w$ and $C_w$, the flux orientation changes from that shown in the FIG. 5 to that shown in the FIG. 12 and the magnitude of the induced voltage on the output winding $C_{ow}$ is $$G_1+H_1-K_2=1+1-0=2$$

Thus, for energization of any two and three of the input windings in coincidence or sequentially, a voltage has been shown to be induced on the carry output winding $C_{ow}$ of the same polarity with the magnitude differing only in the case when all three inputs are coincidently energized. To take care of this signal strength variation a self-biasing arrangement in the carry input circuit of the next stage 10 is employed in the emitter circuit of the transistor.

It is the function of a binary full adder to provide a sum only when any one or all three inputs thereto are energized. Accordingly, manifestation of the sum product will be described in detail below, and, as related above, the sum is derived on the sum output windings $S^+$ and $S^-$ when the core 16 of the FIG. 2 is reset to the flux orientation pattern shown in the FIG. 5.

To correctly determine the induced voltages on the output windings $S^+$ and $S^-$ for the various input conditions, a comparison is made for the configurations shown in each of the FIGS. 6–12 with that shown in the FIG. 5. Accordingly, with energization of the $A_w$ input winding alone during the interval $t_1$—$t_2$ and upon energization of the reset winding 20 with a current pulse as indicated in the FIG. 3 to thereafter reset the core 16 to the configuration shown in the FIG. 5, it may be seen that the induced voltages are $$S^-=G_2+H_2-K_1=0+(-1)-0=-1$$
$$S^+=-G_2-H_2+K_1=-0-(-1)+0=1$$

providing an induced voltage on both the $S^-$ and $S^+$ output windings of opposite polarity. With only the $B_w$ winding energized, $$S^-=G_2+H_2-K_2=(-1)+0-0=-1$$

and $$S^+=-G_2-H_2+K_1=-(-1)-0+0=1$$

a sum output is again provided on both the $S^-$ and $S^+$ output windings, when the flux orientation changes from that shown in the FIG. 7 to that of FIG. 5. Similarly, with the $C_w$ input only energized, $$S^-=G_2+H_2-K_2=+(-1)+(-1)-(-1)=-1$$
$$S^+=-G_2-H_2+K_2=1+1-1=1$$

to again provide a positive voltage on the $S^+$ output winding when the flux orientation is reset from that of FIG. 8 to that shown in FIG. 5.

When any two inputs are energized either coincidently or sequentially, their resultant flux pattern is as shown in the FIGS. 9, 10 and 11 and upon reset of the core 16 to the pattern shown in the FIG. 5, the sum output for the condition of FIG. 9 is $$S^- = G_2 + H_2 - K_1 = 0 + 0 - 0 = 0$$
$$S^+ = -(S^-) = 0$$

and for the condition of FIG. 10

$$S^- = G_2 + H_2 - K_1 = 0 + (-1) - (-1) = 0$$
$$S^+ = -(S^-) = 0$$

while similarly for the FIG. 11

$$S^- = (-1) + 0 - (-1) = 0$$
$$S^+ = -(S^-) = 0$$

providing no sum output for any two inputs.

Again, the only difference between the case when any two inputs A, B or C are provided sequentially or coincidently with the addition of the third input, is the flux configuration as shown in the FIG. 12, and when compared with the reset pattern shown in FIG. 5, the sum output is seen to be $$S^- = G_2 + H_2 - K_1 = 0 + 0 - (-1) = 1$$
$$S^+ = -(S^-) = -1$$

Thus, for any one input condition the sum output line $S^+$ has a positive signal induced thereon while the $S^-$ output has a negative signal induced thereon and when all three inputs are received, the $S^+$ winding has a negative voltage induced thereon while the $S^-$ output winding has a positive voltage induced thereon. As described above, it is because of this peculiar condition that the collectors of the transistors $TS^+$ and $TS^-$ are commoned and coupled to the sum output line S of the circuit to provide the same polarity output for each of the different cases enumerated above.

In describing the flux orientation within the core 16 in response to the various input conditions, a linking flux pattern is shown in the FIGS. 9–12 describing a "kidney" type configuration. While this kidney type configuration is evident upon coincident energization of the different input windings $A_w$, $B_w$ and $C_w$, when sequential type operation takes place the "kidney" pattern breaks up into circular patterns about each aperture 24, 26 and 28. Although the patterns shown in the FIGS. 9–12 are not completely true for sequential type inputs, the directions of flux orientation as shown in the different figures is the same and therefor different figures illustrating circular as compared to "kidney" patterns is unnecessary.

It should also be noted that the source 18 in the FIG. 2 is adapted to provide a bias to the base of the transistors $TS^+$ and $TS^-$ during the time $t_1$—$t_2$, as indicated in the FIG. 3. This base bias is employed to effectively block the transistors $TS^+$ and $TS^-$ until the time $t_2$ so that voltages induced in the windings $S^+$ and $S^-$ during the time $t_1$—$t_2$ due to the energization of the input windings $C_w$, $A_w$ and/or $B_w$ are blocked.

While the invention has been particularly shown and described with reference to a preferred embodiment thereof, it will be understood by those skilled in the art that various changes in form and details may be made therein without departing from the spirit and scope of the invention.

What is claimed is:

1. A binary full adder circuit comprising a first and a second digit input line and a carry input line, a carry output line and a sum output line, means magnetically coupling said input and output lines responsive to the random energization of said input lines in any time sequence to provide an impulse on said carry output line when any two of said input lines are energized and to provide an impulse on said sum output line when only one or all three of said input lines are energized.

2. A binary full adder comprising a first and a second digit input line and a carry input line, a carry output line and a sum output line. A multiapertured magnetic core made of material exhibiting a substantially rectangular hysteresis characteristic, each of said input and output lines being selectively threaded through apertures of said core in a predetermined manner, means for resetting said core, said core responsive to the energization of said input lines on a random basis and any time sequence to provide an impulse on said carry output line when two of said input lines are energized and to thereafter provide an impulse on said sum output line when said core is reset if only one or all of said input lines were energized.

3. A binary full adder comprising a multiapertured magnetic core made of material exhibiting a substantially rectangular hysteresis characteristic, first and second digit input windings, a carry input winding, a carry output winding and first and second sum output windings each selectively threaded through predetermined apertures of said core, means for resetting said core, said input windings adapted to be energized on a random basis and in any time sequence, said carry output winding being threaded such that an impulse is induced therealong when any two of said input windings have been energized, said sum output windings being threaded such that an impulse is induced therealong when said core is reset if only one or all of said input windings have been energized, and means for gating impulses induced along said sum output windings concurrently with the operation of said reset means.

4. The adder of claim 3, wherein said gating means includes a pair of transistors.

5. A binary full adder comprising a multiapertured magnetic core made of material exhibiting a substantially rectangular hysteresis characteristic, a first and a second digit input winding and a carry input winding, a carry output winding and a first and second sum output winding, said windings threaded through the different apertures of said core to link portions thereof in a predetermined combinatorial manner, means for resetting said core, said core responsive to the energization of said input windings on a random basis and in any time sequence to provide an impulse on said carry output winding when two of said input windings are energized and thereafter capable of providing an impulse on said sum output windings upon being reset if one or all three of said input windings were energized, and means for gating impulses provided along said sum output windings concurrently with the operation of said reset means.

6. The adder of claim 5 wherein said gating means includes a first and a second transistor connected one to each of said sum output windings.

7. An adder comprising a magnetic core made of material capable of attaining opposite stable states of remanent flux density, said core having a central aperture defining a main closed flux path of magnetic material and a plurality of secondary apertures located in the main flux path of said core, a first and second digit input winding and a carry input winding each coupling a portion of said core only and respectively threading a different secondary aperture thereof, a carry output winding and a first and second sum output winding threading the apertures of said core in a predetermined combinatorial manner, a reset winding coupled to the material defining said main flux path, means for energizing said reset winding, said core being operative upon the energization of any two of said input windings on a random basis and in any time sequence to induce an impulse on said carry output winding, said core being further operative to induce an impulse of one polarity on said first sum output winding and an impulse of opposite polarity on said second sum output winding upon energization of said reset winding if only one or all three of said input windings have been energized, and means for gating the impulses on said sum output windings concurrently with the energization of said reset winding.

8. In a circuit for providing an arithmetic switching operation on a pair of numerals each represented by a plurality of impulses, a plurality of input and a plurality of output means, and magnetic switching means connecting said input and said output means and defining a plurality of flux paths, each of said output means coupling selected ones of said flux paths in different predetermined combinatorial manner, said switching means being responsive to the energization of said input means in random order and in any time sequence to provide information impulses representative of said arithmetic switching operation thus effected along a selected one of said output means.

9. In a circuit as set forth in claim 8 wherein said magnetic switching means includes means for providing first information pulses along said output means immediately upon the occurrence of a first switching operation and second information pulses along said output means upon the completion of said arithmetic switching operation.

10. A binary full adder comprising a multiapertured magnetic core made of material exhibiting a substantially rectangular hysteresis characteristic, a first and a second digit input winding and a carry input winding each threaded through one aperture of said core, a carry output winding and a first and second sum output winding each selectively threaded in predetermined combinatorial manner through a plurality of apertures of said core, means for resetting said core, said carry output winding being threaded through said plurality of apertures such that an impulse is induced on said carry output winding upon any two of said input windings having been energized in random order and in any time sequence, each of said sum output windings being threaded through said plurality of apertures in complementary manner such that impulses of opposite polarity are induced therealong when said core is reset if one or all of said input windings have been previously energized, and register means responsive to said impulses provided along said sum output windings.

11. An arithmetic system comprising a plurality of binary full adder stages, each of said adder stages comprising a multiapertured magnetic core made of material exhibiting a substantially rectangular hysteresis characteristic, first and second input windings, a carry input winding, a carry output winding and first and second sum output windings each threaded through the apertures of said core such that an impulse is induced along said carry output winding upon any two or all of said input windings being energized in random order and in any time sequence and impulses of opposite polarity are induced along respective ones of said sum output windings upon a resetting of said core if one or all of said input windings have been previously energized, means for resetting each of said cores, said carry input winding of each stage being connected to the carry output winding of a next lower order stage whereby carry information is provided said each stage immediately upon a second one of said input windings of said next lower order stage having been energized, and sum register means connected to said first and said second sum output windings.

12. A binary full adder comprising a magnetic core made of material exhibiting substantially rectangular hysteresis characteristic and having a central opening and a plurality of secondary openings disposed about said central opening whereby portions of core intermediate each of said secondary openings and said central opening and the core periphery each define a flux path, reset means for orienting flux in each of said flux paths so defined in a same first direction, a first and a second input lead and a carry input lead threaded one through each of said secondary openings and operative upon being energized to reverse the orientation of said flux saturation in one of said flux paths defined by said threaded secondary opening whereby flux orientation in the other portion of said core is "kidneyed," a carry output lead inductively coupled to at least three of said flux paths so defined such that an impulse is induced therealong immediately upon the reversal of flux saturation in any two of said three flux paths, sum output means inductively coupled to at least three different flux paths so defined such that an impulse is induced therealong upon a resetting of said core only if flux orientation in an odd number of said different flux paths is reversed to said first direction, and register means connected to said sum output means.

13. A binary full adder as defined in claim 12 wherein said sum output means inludes a first and a second sum lead inductively coupled in complimentary fashion to said different flux paths whereby impulses of opposite polarity are induced along each on a resetting of said core.

14. In combination, a plurality of input means and a plurality of output means, magnetic means coupling said input means and said output means and defining a plurality of flux paths to which said output means are each selectively coupled in different predetermined combinatorial manner, said magnetic means being rsponsive to the energization of particular ones of said input means in random order and in any time sequence for energizing a predetermined one of said output means, and reset means coupled to said magnetic means, said magnetic means operative upon being reset to energize another of said output means if others of said input means have been energized.

15. The combination as defined in claim 14 including means for gating at least one of said output means.

16. In combination, a plurality of input winding means and a plurality of output winding means, a magnetic structure defining a plurality of flux paths and formed of a material exhibiting substantially rectangular hysteresis characteristics, said input winding means being coupled to said magnetic structure such that the energization of an input winding means is effective to alter flux patterns within said magnetic structure whereby flux orientation along only particular ones of said flux paths is reversed, each of said output winding means being coupled to said magnetic structure along selected ones of said flux paths in different predetermined combinatorial manner, said magnetic structure being responsive to the energizing of said input winding means on a random basis and in any time sequence to define different flux patterns within said magnetic structure, said output winding means being energized upon reversal of flux orientation along said selected flux paths when said flux patterns are defined.

17. The combination as defined in claim 16 further including reset winding means coupled to said magnetic structure and means for gating at least one of said output winding means.

References Cited in the file of this patent

UNITED STATES PATENTS

| | | |
|---|---|---|
| 2,927,307 | Rajchman | Mar. 1, 1960 |
| 2,962,215 | Haynes | Nov. 16, 1960 |
| 2,963,591 | Crowley et al. | Dec. 6, 1960 |

UNITED STATES PATENT OFFICE

CERTIFICATE OF CORRECTION

Patent No. 3,129,324 April 14, 1964

Hua-tung Lee

It is hereby certified that error appears in the above numbered patent requiring correction and that the said Letters Patent should read as corrected below.

Column 2, line 65, for "inevntion" read -- invention --; line 66, for "acompanying" read -- accompanying --; column 10, line 5, for "line. A" read -- line, a --; line 11, after "and" insert -- in --; column 11, line 38, for "complementary" read -- complimentary --; column 12, line 21, for "inludes" read -- includes --; line 30, for "rsponsive" read -- responsive --.

Signed and sealed this 29th day of December 1964.

(SEAL)
Attest:

ERNEST W. SWIDER
Attesting Officer

EDWARD J. BRENNER
Commissioner of Patents